United States Patent
Cano

[11] Patent Number: 6,044,856
[45] Date of Patent: Apr. 4, 2000

[54] RAIN SHIELD CANOPY FOR USE WITH AN AUTOMOBILE

[76] Inventor: Louis A. Cano, 13425 Graystone Ave., Norwalk, Calif. 90650

[21] Appl. No.: 09/037,618

[22] Filed: Mar. 10, 1998

[51] Int. Cl.[7] .............................. E04H 15/06; B60J 7/00
[52] U.S. Cl. ..................................... 135/88.07; 135/88.01; 135/88.05; 135/88.09; 135/88.11; 135/903; 296/99.1; 296/146; 296/152
[58] Field of Search ............... 135/88.05, 88.07, 135/88.09, 88.11, 88.01, 88.1, 903; 296/99.1, 146.1, 152, 143, 146, 139, 97.8

[56] References Cited

U.S. PATENT DOCUMENTS

| | | | |
|---|---|---|---|
| 2,532,989 | 12/1950 | Biondi | 135/88.05 X |
| 3,722,571 | 3/1973 | Knight et al. | 135/88.11 X |
| 4,171,013 | 10/1979 | Clark | 135/88.11 X |
| 4,201,412 | 5/1980 | Williams et al. | 296/163 |
| 5,476,302 | 12/1995 | Ronci | 296/152 X |

*Primary Examiner*—Robert Canfield
*Attorney, Agent, or Firm*—Goldstein & Canino

[57] ABSTRACT

A rain shielding canopy for use with an automobile comprising a housing assembly securely mounted to the roof and windshield pillar of the automobile. The housing assembly accommodates a roll rotatably mounted within the housing, a waterproof cover wound around the roll, and a wind-up spring in operative engagement with the roll such that the waterproof cover extends and retracts from the housing assembly as the door of the vehicle is opened and closed. A mounting strip is fastened to the door which has a plurality of attachment hooks attached thereto. The waterproof cover is provided with a plurality of hook receiving means for releasably engaging with the attachment hooks on the mounting strip. When the rain shielding canopy is properly installed on an automobile, the waterproof cover extends from the housing assembly to protect the area between the door and the vehicle against rain, as the door is opened.

5 Claims, 3 Drawing Sheets

RAIN SHIELD CANOPY FOR USE WITH AN AUTOMOBILE

BACKGROUND OF THE INVENTION

This invention relates to a rain shielding canopy. More particularly, the invention relates to a rain shielding canopy for use with an automobile which employs a housing mounted to the roof and windshield pillar of the automobile, a waterproof cover extendably and retractably mounted within the housing designed for shielding a person from rainwater during entering and exiting of the automobile.

When a heavy rain storm is encountered, it is difficult to coordinate an umbrella and the car door so as to avoid getting wet while entering or leaving the automobile. Especially when it is necessary for a driver or a passenger to place groceries or a baby into the vehicle, such an individual is unprotected against rainwater from the time he closes his umbrella until he is finished loading his car and finally gets into his car. An exposure to the rainwater can not only bring discomfort and even sickness but can also cause damage to the interior of the car, especially to water sensitive electronic components in the door panel for operating the windows and door locks. Thus, it is desirable to have a device that can deflect rainwater while an individual gets into or out of a vehicle so as to allow the individual to open the vehicle's door and open or close an umbrella without getting drenched by rainwater.

Various references uncovered in the prior art provide devices that mount on or within the car for protecting car users from rainwater. For example, U.S. Pat. No. 4,562,849 to Sirota discloses an umbrella unit for mounting on a car in the region of its doors to protect car users from rain. The umbrella unit includes first drive with transmission for opening and closing the umbrella, and second drive and transmission for turning the umbrella out of and into its housing. Likewise, U.S. Pat. No. 4,201,412 to Williams discloses a camping car including a rain protection canopy stored within a space inside the vehicle roof which automatically slides outward when the vehicle door is opened. Williams may provide some utility for protecting car users from rainwater, but cannot be incorporated into an existing automobile because the canopy is constructed of a rigid panel that must be incorporated into the vehicle during the manufacturing process.

Despite all these prior art devices, there is still a further need to provide an improved rain shielding canopy for use with an automobile. Such a rain shielding canopy should be capable of deflecting rainwater while an individual gets into or out of a motor vehicle so as to allow the individual to open the vehicle's door and open or close an umbrella without getting drenched with rainwater. Moreover, such a rain shielding canopy can be readily incorporated into an existing automobile, and yet is capable of allowing a driver or a passenger to place their baby car seat or groceries in their car without getting wet by providing a waterproof cover that extends from the housing assembly to protect the area between the door and the vehicle from rainwater.

While these units mentioned above may be suitable for the particular purpose employed, or for general use, they would not be as suitable for the purposes of the present invention as disclosed hereafter.

SUMMARY OF THE INVENTION

It is an object of the invention to provide a rain shielding canopy that can deflect rainwater while an individual gets into or out of a motor vehicle so as to allow the individual to open the vehicle's door and open or close an umbrella without getting drenched with rainwater.

It is another object of the invention to provide a rain shielding canopy which can be readily incorporated into an existing automobile.

It is yet another object of the invention to provide a rain shielding canopy which will allow a driver or a passenger to place their baby car seat or groceries in their car without getting soaking wet by providing a waterproof cover that extends from the housing assembly as the door is opened to protect the area between the door and the vehicle from rainwater.

The invention is a rain shielding canopy for use with an automobile comprising a housing assembly securely mounted to the roof and windshield pillar of the automobile. The housing assembly accommodates a roll rotatably mounted within the housing, a waterproof cover wound around the roll, and a wind-up spring in operative engagement with the roll such that the waterproof cover extends and retracts from the housing assembly as the door of the vehicle is opened and closed. A mounting strip is fastened to the door which has a plurality of attachment hooks attached thereto. The waterproof cover is provided with a plurality of hook receiving means for releasably engaging with the attachment hooks on the mounting strip. When the rain shielding canopy is properly installed on an automobile, the waterproof cover extends from the housing assembly to protect the area between the door and the vehicle against rain, as the door is opened.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
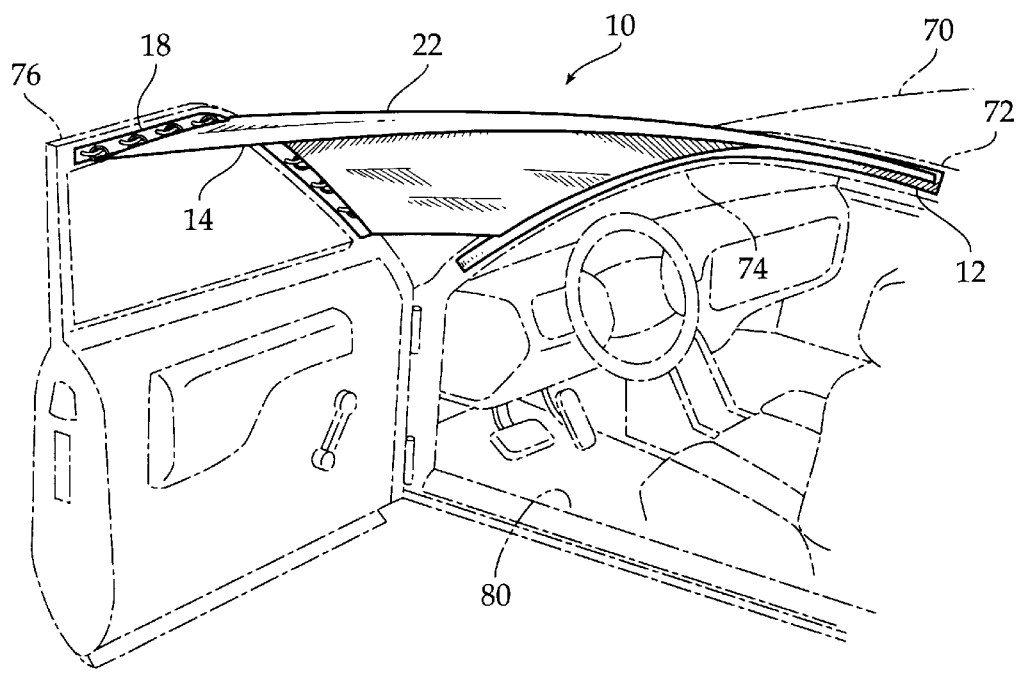
FIG. 1 is a diagrammatic perspective view of the instant invention being used on an automobile.
Figure 2:
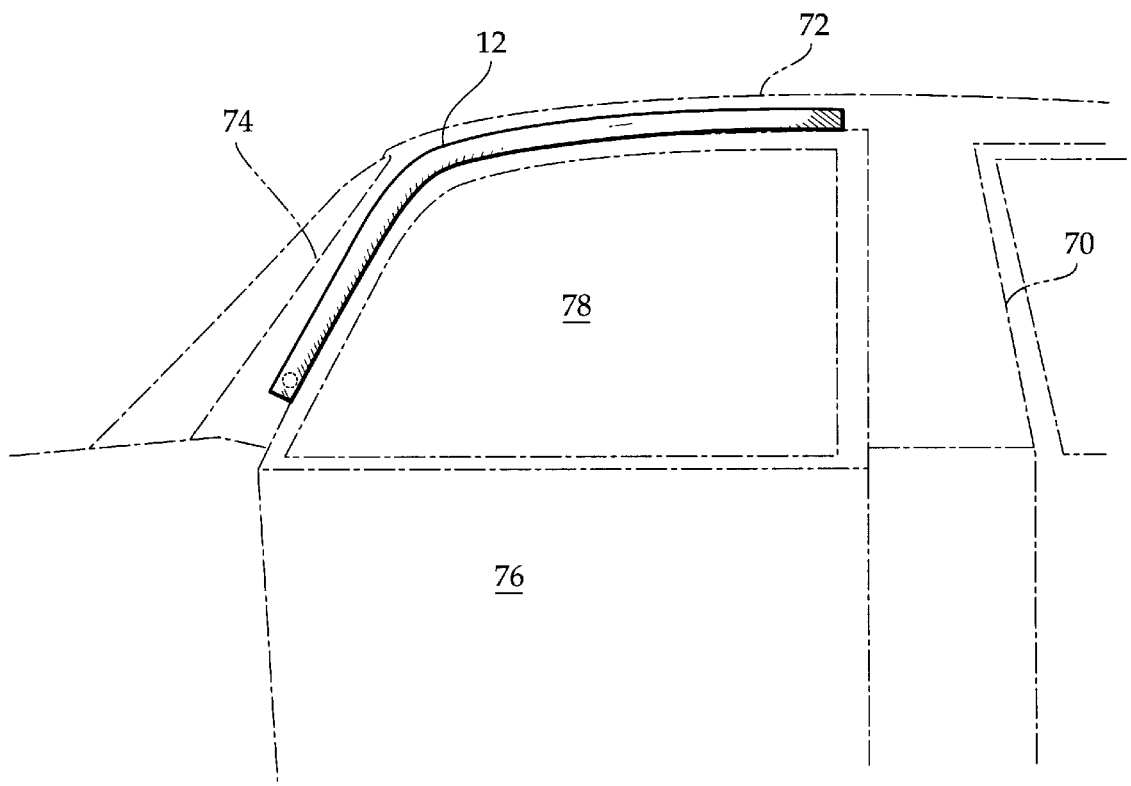
FIG. 2 is a side elevational view of the housing assembly of the instant invention attached to the roof and windshield pillar of the automobile.

FIG. 1 illustrates an automotive vehicle 70 incorporating the principles of a preferred embodiment of the present invention 10. For a better understanding of the present invention 10, the automotive vehicle 70 is illustrated consisting generally of a roof 72, a windshield pillar 74, a door 76, a door window 78, and an interior 80. FIG. 2 illustrates the rain shielding canopy 10 including a housing assembly 12 securely mounted to the roof 72 and windshield pillar 74 of the automobile 70. The housing assembly 12 can be secured to the vehicle 70 by affixing screws, by applying adhesives, or by any other fastening means as would be appreciated by those skilled in the art. The housing assembly 70 includes one or more drain holes for removing water collected inside thereof, said drain hole shown in FIGS. 2 and 4.

Figure 3:
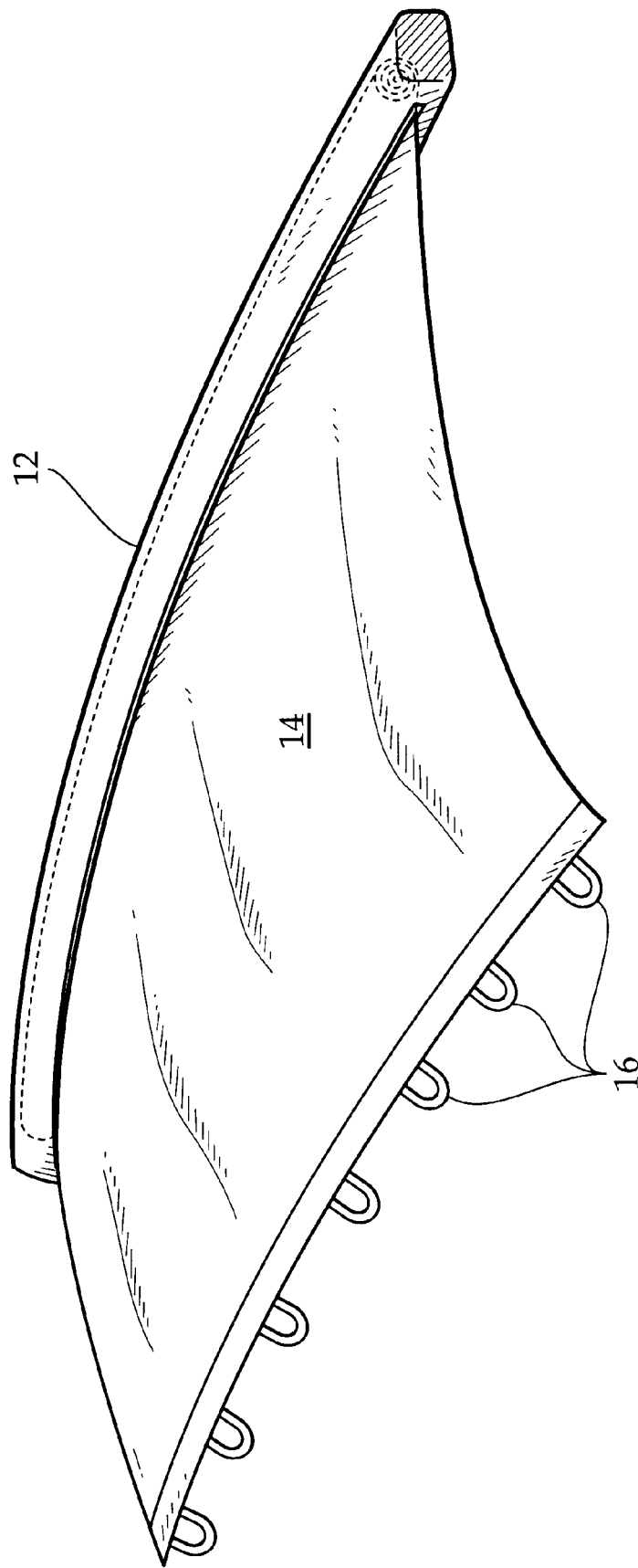
FIG. 3 is a diagrammatic perspective view of the instant invention, illustrating the canopy extended from the housing.
Figure 4:
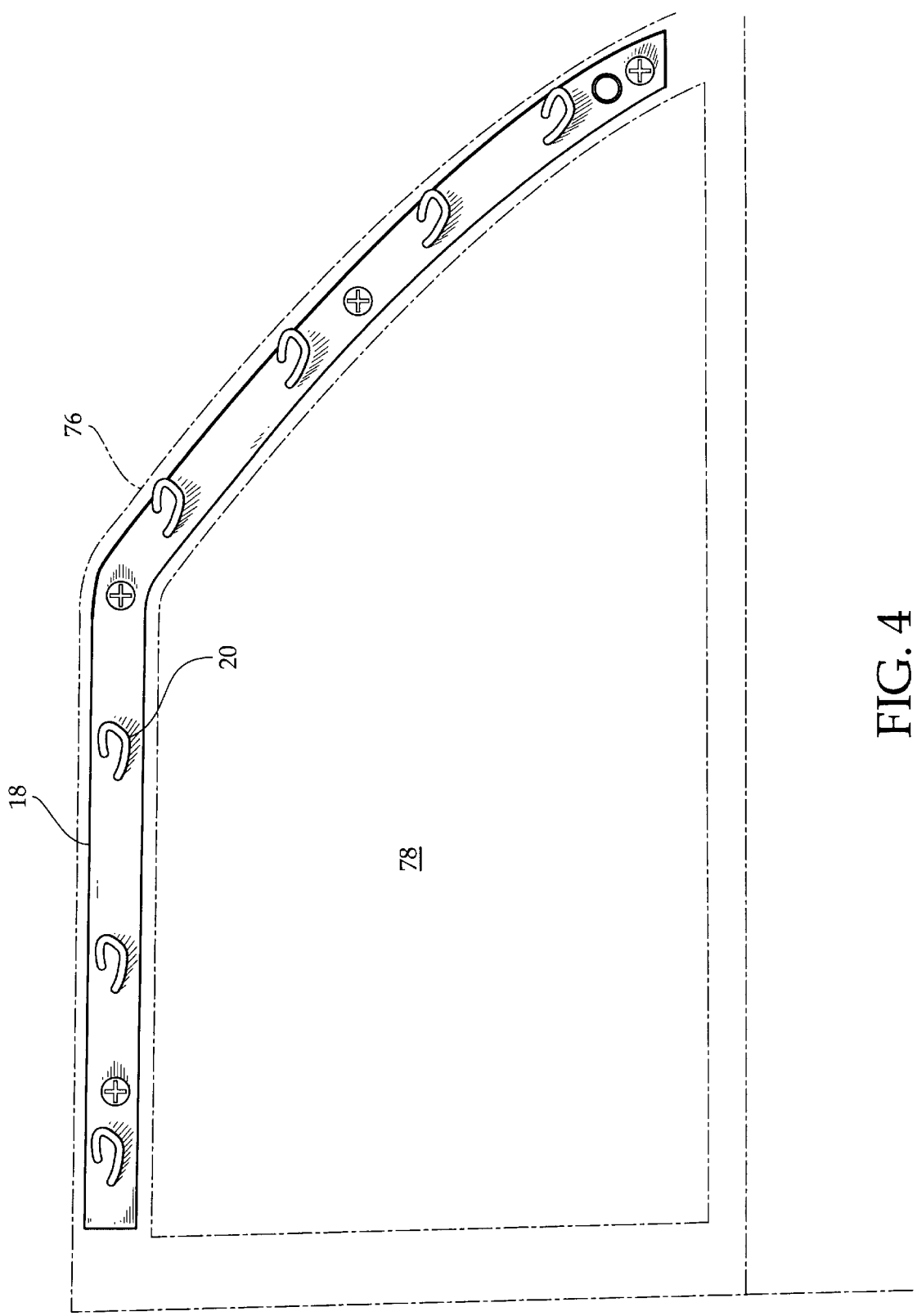
FIG. 4 is a side elevational view of the mounting strip attached to the door of the automobile, illustrating the hook receiving means attached thereto for engaging with the attachment hooks on the canopy.

FIGS. 1 and 3 illustrate the housing assembly 12 including a roll rotatably mounted within the housing 12, a cover 14 wound around the roll, and a wind-up spring mechanism in operative engagement with the roll such that the cover 14 is extended and retracted from the housing assembly 12 as the door 76 of the vehicle 70 is opened and closed. The cover 14 is preferably made of nylon, polyester, or any other suitable waterproof material capable of achieving the desired function. FIG. 3 illustrate the waterproof cover 14 having a plurality of hook receiving means 16 attached thereto for releasably connecting to the car door 76 adjacent to the housing assembly 12. FIGS. 1 and 4 illustrate a mounting strip 18 affixed to the automobile door 76 which is provided with a plurality of attachment hooks 20 attached thereto for releasably engaging with the hook receiving means 16 of the waterproof cover 14.

FIG. 1 illustrates the waterproof cover 14 being pulled out of the housing assembly 12 when the car door 76 is opened, this causes the roller to rotate against the opposing force exerted by the spring mechanism. The wind-up spring mechanism constantly pulls the cover 14 into the housing assembly 12, creating a relatively strong rain deflecting surface 22 between the top of the door 76 and the roof 72 of the car 70 as the car door 76 is manually opened. Due to the constant pulling action by the wind-up spring mechanism on the cover 14 toward the housing assembly 12, this prevent the cover 14 from collapsing while the door is opened so as to create a relatively flat horizontal curvature allowing rainwater to flow away from an individual entering and exiting the vehicle 70 and away from the interior 80 of the vehicle 70. The wind-up action of the spring preferably has sufficient strength to allow the cover 14 to automatically roll back into the housing assembly 12 as the car door 76 is closed.

To protect against rainwater, the waterproof cover 14 is connected to the car door 76 by manually fastening the hook receiving means 16 on the cover 14 to the attachment hooks 20 protruding from the mounting strip 18. When the rain shielding canopy 10 is properly secured to the roof 72 and the door 76 of an automobile 70, the waterproof cover 14 extends from the housing assembly 12 to protect the area between the door 76 and the roof 72 of the vehicle against rain, as an individual gets into and out of his vehicle. Thus, rather than having the rainwater fall on the interior 80 of the vehicle possibly damaging those electronic components in the door panel for windows and door locks that are sensitive to water, the raindrops are deflected on top of the cover 14 and flows away from an individual entering and exiting the vehicle 70 as well as away from the interior of the vehicle.

Alternatively, when the possibility of encountering a rain storm is remote, the waterproof cover 14 may be manually disengaged from the mounting strip 18 by simply releasing the hook receiving means 16 from the attachment hooks 20 protruding from the mounting strip 18.

While the embodiments of the present invention are disclosed in relation to the rain shielding canopy 10 which is specifically designed for driver side door, it will be apparent to those skilled in the art that the rain shielding canopy disclosed herein may be modified to suit other vehicle door types and sizes.

Many specific details contained in the above description merely illustrate some preferred embodiments and should not be construed as a limitation on the scope of the invention. Many other variations are possible.

What is claimed is:

1. A rain shielding canopy in combination with an automobile having a door, a roof, and a windshield pillar, comprising:
   a) a housing mounted externally to the roof and windshield pillar of the automobile;
   b) a cover stored within said housing;
   c) attachment means for releasably attaching said cover to the automobile door; and
   d) extending and retracting means for extending said cover out of the housing as the automobile door is manually opened, and retracting said cover into the housing as the automobile door is manually closed.

2. The combination as recited in claim 1, wherein the extending and retracting means further comprises:
   a) a roll rotatably mounted within the housing, wherein the cover is wound around said roll; and
   b) a wind-up spring, said wind-up spring being operatively engaged with said roll such that the cover rolls out of the housing as the automobile door is manually opened, and the cover automatically rolls into the housing by wind-up action of the spring as the automobile door is manually closed.

3. The combination as recited in claim 2, wherein the attachment means further comprises a mounting strip mounted to the automobile door, said mounting strip having a plurality of attachment hooks attached thereto for releasably connecting to the cover, and wherein the cover further comprises a plurality of hook receiving means attached thereto for releasably engaging with the attachment hooks on the mounting strip.

4. The combination as recited in claim 3, wherein the housing further comprises a drain hole for removing water collected within the housing.

5. The combination as recited in claim 4, wherein the cover is constructed of a strong, waterproof material.

* * * * *